United States Patent
Bousquet et al.

(10) Patent No.: US 9,146,806 B2
(45) Date of Patent: Sep. 29, 2015

(54) METHOD FOR PROCESSING TRANSMISSION ERRORS, IN PARTICULAR NOISE, DURING A CONTACTLESS COMMUNICATION BETWEEN A CARD AND A READER

(71) Applicants: STMICROELECTRONICS (ROUSSET) SAS, Rousset (FR); MELEXIS TECHNOLOGIES NV, Tessenderlo (BE)

(72) Inventors: Thierry Bousquet, Chateauneuf le Rouge (FR); Oleksandr Zhuk, Vaumarcus (CH)

(73) Assignees: STMICROELECTRONICS (ROUSSET) SAS, Rousset (FR); MELEXIS TECHNOLOGIES SA, Bevaix (CH)

(*) Notice: Subject to any disclaimer, the term of this patent is extended or adjusted under 35 U.S.C. 154(b) by 61 days.

(21) Appl. No.: 14/154,570

(22) Filed: Jan. 14, 2014

(65) Prior Publication Data

US 2014/0208190 A1 Jul. 24, 2014

(30) Foreign Application Priority Data

Jan. 24, 2013 (FR) .................................... 13 50593

(51) Int. Cl.
*G06F 11/10* (2006.01)
*H04B 5/00* (2006.01)
*H04L 1/00* (2006.01)

(52) U.S. Cl.
CPC .......... *G06F 11/1004* (2013.01); *H04B 5/0031* (2013.01); *H04B 5/0056* (2013.01); *H04L 1/0045* (2013.01)

(58) Field of Classification Search
CPC G06F 11/1004; H04B 5/0031; H04B 5/0056; H04B 5/00; H04B 5/0075; H04B 5/0081; H04B 5/0025; H04L 1/0045; G06K 7/0008; G06K 7/10237; H04W 4/008; H04W 12/06
USPC .......................................................... 714/799
See application file for complete search history.

(56) References Cited

U.S. PATENT DOCUMENTS

| | | | |
|---|---|---|---|
| 6,907,125 B1* | 6/2005 | Oishi ............................ | 380/239 |
| 7,963,443 B2* | 6/2011 | Patton .......................... | 235/451 |
| 7,975,921 B2* | 7/2011 | Mani et al. ................... | 235/441 |
| 8,400,913 B2* | 3/2013 | Abel ............................. | 370/230 |
| 2004/0257203 A1 | 12/2004 | Maltsev et al. | |
| 2005/0111420 A1* | 5/2005 | Fujii ............................. | 370/338 |

(Continued)

FOREIGN PATENT DOCUMENTS

| WO | 2008026112 A2 | 3/2008 |
|---|---|---|
| WO | 2008091065 A1 | 7/2008 |
| WO | 2009144534 A1 | 12/2009 |

*Primary Examiner* — James C Kerveros
(74) *Attorney, Agent, or Firm* — Allen, Dyer, Doppelt, Milbrath & Gilchrist, P.A.

(57) ABSTRACT

A method is for processing transmission errors during contactless communication of information between a device and a reader. The information may be transmitted in the form of frames sent to a send/receive module of the reader in contactless coupling with the device and controlled by a control module coupled to the send/receive module. The information may be extracted from the frames within the send/receive module so as to be delivered to the control module. The method may include a detection of transmission errors that are to be ignored.

26 Claims, 4 Drawing Sheets

(56) References Cited

U.S. PATENT DOCUMENTS

| | | | |
|---|---|---|---|
| 2005/0117609 A1* | 6/2005 | Ohkawa | 370/517 |
| 2005/0120130 A1* | 6/2005 | Ohkawa | 709/232 |
| 2005/0255843 A1* | 11/2005 | Hilpisch et al. | 455/425 |
| 2007/0069859 A1 | 3/2007 | Bae et al. | |
| 2008/0291852 A1 | 11/2008 | Abel | |
| 2009/0166419 A1* | 7/2009 | Patton | 235/439 |
| 2010/0105324 A1* | 4/2010 | Takayama | 455/41.2 |
| 2012/0047339 A1* | 2/2012 | Decasper et al. | 711/162 |
| 2012/0129470 A1* | 5/2012 | Tandai et al. | 455/73 |
| 2012/0220228 A1* | 8/2012 | Tandai et al. | 455/41.1 |
| 2014/0153469 A1* | 6/2014 | Park et al. | 370/311 |
| 2014/0273826 A1* | 9/2014 | Want et al. | 455/41.1 |

* cited by examiner

METHOD FOR PROCESSING TRANSMISSION ERRORS, IN PARTICULAR NOISE, DURING A CONTACTLESS COMMUNICATION BETWEEN A CARD AND A READER

TECHNICAL FIELD

The present disclosure relates to wireless communications, and more particularly, to the processing of transmission errors when transmitting information from the card to the reader performed in accordance with the EMV contactless specification (EMVCo: EMV Contactless).

BACKGROUND

Near Field Communication (NFC) is a wireless technology that allows communication over a short distance, for example, 10 cm, between electronic devices, such as contactless chip cards or mobile telephones emulated in card mode, and readers. NFC technology is adapted for connecting any type of user device and allows fast and easy communications.

A contactless device is a device capable of exchanging information via an antenna with another contactless device according to a contactless communication protocol. An NFC device, which is a contactless device, is a device compatible with NFC technology.

NFC technology is an open technological platform standardized in the standard ISO/IEC 18092 and ISO/IEC 21481 but incorporates numerous already existing standards, such as, for example, the type A and type B protocols defined in the standard ISO-14443, which can be communication protocols usable in NFC technology. In addition to its typical telephone function, a cellular mobile telephone can be used (if it is equipped with specific components) to exchange information with another contactless device, for example, a contactless reader, by using a contactless communication protocol usable in NFC technology.

This makes it possible to exchange information between the contactless reader and secure elements situated in the mobile telephone. Numerous applications are thus possible, such as mobile ticketing in public transport (the mobile telephone behaves as a ticket or fare) or mobile payment (the mobile telephone behaves as a payment card).

Moreover, Europay Mastercard Visa (EMV) is an international security standard for payment cards of the chip card type that was initiated by the EMVCo consortium. Most, or indeed all, bank chip cards comply with the EMV standard as do most or indeed the entire pool of electronic payment terminals. Various sources describing the specifications of the EMV standard, in particular, version 4.3 of November 2011, are available from the EMVCo consortium.

Moreover, some specifications, entitled "EMV Contactless Specifications for Payment Systems" and comprising, in version 2.1 of March 2011 available from the EMVCo consortium, four books, deal especially with the contactless communication protocol used to perform bank transactions between two contactless devices, and in compliance with the EMV standard. The communication protocol for the contactless EMV standard is thus based mainly on the protocol described in the standard ISO/IEC 14443.

A contactless reader generally comprises a send/receive module, also called "radiofrequency head" (or "RF front end") intended to be in proximity coupling with the contactless card or the mobile telephone emulated in card mode. This send/receive module is controlled by an external microcontroller, which is coupled by a bus to the send/receive module.

The send/receive module receives the frames transmitted by the card, extracts the data bits (representing for example responses to commands) contained in these frames, and transmits them to the external microcontroller.

In the reverse direction; the send/receive module receives data bits (representing, for example, commands) intended for the card, encapsulates them in frames and transmits these frames to the card. The transmissions of information between the card and the reader may be marred by errors. One speaks of transmission error when an invalid frame is received, for example, when the modulation of the signal or the coding of the bits or the format (structure) of the frame do not comply with the specifications governing contactless communication between the card and the reader.

Some of these errors may be errors due to noise, for example, when the card is too far from the reader or when the microcontroller contained in the card generates the noise itself. This noise is also designated by the term "electromagnetic disturbance" (EMD). Moreover, it may be specified in certain cases, such as, for example, in the aforementioned specifications entitled "EMV Contactless Specifications for Payment Systems," that certain transmission errors marring a response of the card are to be ignored by the reader and that the latter must then be capable of processing a new correct response of the card at the latest on expiration of a specified duration after the end of the response marred by the error that is to be ignored.

Other well defined transmission errors must on the other hand be processed by the reader, this generally causing the external microcontroller to dispatch a command to the send/receive module so as to reinitialize the magnetic field generated by the send/receive module inside the volume in which the card and the reader can communicate with one another.

The management of transmission errors, be it those that are to be ignored by the reader, in particular errors due to noise, or those that are not to be ignored so as to be processed, is a major issue for robustness of communication and reliability. Specifications of tests, for example, those contained in the document entitled EMVCo Type Approval Contactless Terminal Level 1, PCD Digital Test Bench & Test Cases, version 2.1a, October 2011, and available from the EMVCo consortium, have been established to ensure that the readers are capable of satisfying the specified requirements in the presence of disturbances of the EMD type.

SUMMARY

According an embodiment, a method and a reader may make it possible to effectively manage the transmission errors that are to be ignored, in particular, those due to electromagnetic disturbances.

According an embodiment, a method and a reader may make it possible to satisfy the EMVCo certification tests related to "EMD" disturbances, in particular, the test specifications contained in the aforementioned document entitled EMVCo Type Approval Contactless Terminal Level 1, PCD Digital Test Bench & Test Cases, version 2.1a, October 2011.

According to one aspect, a method is for processing transmission errors during contactless communication of information between a device, for example, a card, and a reader. The information may be transmitted in the form of frames to a send/receive module of the reader in contactless coupling with the device and controlled by a control module coupled to the send/receive module. The information may be extracted from the frames within the send/receive module so as to be delivered to the control module. The method may comprise a detection of transmission errors that are to be ignored, for example, errors due to electromagnetic disturbances, which is performed wholly within the send/receive module.

Thus on the one hand, the question of transmission errors due to noise is not managed by attempting to minimize the disturbances which are at the origin thereof, for example, by hardware means of the filter type, but by performing a specific detection of these errors in the reader and what is more in the send/receive module itself, although the latter is not originally envisioned for this. And performing such a detection wholly in the send/receive module, and not for example at least partially in the control module, makes it possible not only to more effectively discriminate the type of error, that is to say to more effectively differentiate the errors that are to be ignored from those that are to be processed, but also to do so more rapidly.

Moreover, provision is made for the method to also comprise, after detection of a transmission error that is to be ignored, and before the expiration of a reference duration, an auto-setting of the send/receive module to a state in which it is ready to process a new frame originating from the device. Stated otherwise, after detection of a transmission error that is to be ignored, the send/receive module places itself in a state in which it is ready to process a new frame originating from the device, without it being necessary in order to do this for it to receive a specific command from the external control module. The send/receive module is thus ready rapidly (quasi-instantaneously) to process a new frame and therefore satisfies the temporal requirements fixed by the test specifications.

According to an embodiment, the detection of a transmission error that is to be ignored may comprise the analysis by the send/receive module of the structure and/or of the content of the frames received and/or of rules for coding the bits transmitted within these frames. The module may analyze, in particular, level 2 elements (for example, of the level (or layer) 2 type of the standard ISO/IEC 14443), such as the format of the frames, the phase of the signals received, the rules for coding the bits, thereby making it possible to more effectively and more rapidly discriminate the type of transmission errors than if using only level 3 elements (for example, of the level (or layer) 3 type of the standard ISO/IEC 14443), that is to say, for example, the data bits extracted from the frames received, such as the bits which are delivered to the external control module of the send/receive module.

As indicated hereinabove, the communication protocol for the EMV contactless specifications ("EMV Contactless") is based on the protocol described in the standard ISO/IEC 14443. The frames transmitted from the card to the reader and described in the "EMV Contactless" specifications can be of type A or of type B with a few structural differences with respect to the frames of type A or B described in the standard ISO/IEC 14443.

According to an embodiment, using frames of type A, such as described in the "EMV contactless" specifications, a frame transmitted by the card can comprise a start-of-frame indication, several bytes of data, and a cyclic redundancy check indication. Moreover, in accordance with the "EMV Contactless" specifications, the bits contained in these frames may be transmitted coded by a coding from the card to the reader, for example, by a coding of the Manchester type. The analysis may comprise an analysis of the start-of-frame indication, an analysis of the cyclic redundancy check indication, an analysis of the number of bytes of each frame, an analysis of the presence or otherwise of residual bits in a frame, and in the case of presence of at least one residual bit, a determination of the violation of the rules for coding these residual bits.

More particularly, a transmission error is considered to be an error that is to be ignored immediately upon the occurrence of at least one of the following: an error is detected during the analysis of the start-of-frame indication, a presence of at least one residual bit is detected in a frame comprising a number of bytes that is less than a threshold, for example, four, a presence of at least one residual bit is detected in a frame comprising a number of bytes that is greater than the threshold with violation of the rules for coding this or these residual bits, or an error is detected during the analysis of the cyclic redundancy check indication in a frame comprising a number of bytes that is less than the threshold. Thus, as soon as at least one of the above cases occurs, it is detected (it is considered) without further effort that the device is dealing with a transmission error that is to be ignored, thereby making it possible to very rapidly reset the send/receive module to its reception state so as to be ready to receive and process a new frame originating from the card, for example. Moreover, by verifying whether the rules for coding any residual bits that may possibly be received have or have not been violated, it is here again possible to discriminate a presence of such residual bits due to noise from an intentional presence of such bits within a valid frame resulting, for example, from the use of a very specific communication protocol, for example, a proprietary protocol.

According to an embodiment, using frames of type B, such as described in the "EMV contactless" specifications, a frame transmitted by the card can comprise several characters, each comprising a byte of data, and a cyclic redundancy check indication. The analysis for detecting a transmission error that is to be ignored comprises an analysis of the structure of the characters, an analysis of the cyclic redundancy check indication, and an analysis of the number of bytes of each frame.

More particularly, a transmission error is considered to be an error that is to be ignored immediately upon the occurrence of at least one of the following: an error is detected in a frame comprising a number of bytes that is less than a threshold, for example, four, during the analysis of the structure of the characters, or during the analysis of the cyclic redundancy check indication. So as to allow a finer analysis of the transmission errors, in particular, at the level of the historical log and of the precise determination of the various error cases, the method may comprise a delivery to the control module of an indication of error code associated with each of the cases.

Another aspect is directed to a send/receive module of a reader, intended on the one hand to be in contactless coupling with contactless device, for example, a contactless card, and on the other hand to be coupled to and controlled by a control module. The send/receive module may comprise reception means or a receiver configured to receive in the form of frames information originating from the card, processing means or a processor configured to extract the information from the frames and deliver it to the control module, and detection means or a detector configured to perform a detection of transmission errors that are to be ignored.

According to one embodiment, the send/receive module furthermore may comprise command means or a command module configured to, after detection of a transmission error that is to be ignored, and before the expiration of a reference duration, place the receiver and the detector in a state in which they are ready to receive and to process a new frame originating from the device. According to one embodiment, the detector is configured to analyze the structure and/or the content of the frames received and/or rules for coding the bits transmitted within these frames.

According to one embodiment in which a frame comprises a start-of-frame indication, several bytes of data and a cyclic redundancy check indication and in which the bits contained in these frames are transmitted coded by a coding. The detector is configured to analyze the start-of-frame indication, the cyclic redundancy check indication, the number of bytes of each frame, the presence or otherwise of residual bits in a frame, and in the case of presence of at least one residual bit, to determine the violation or otherwise of the rules for coding this or these residual bits.

According to one embodiment, the detector may be configured to consider a transmission error as being an error that is to be ignored immediately upon the occurrence of at least one of the following: an error is detected during the analysis of the start-of-frame indication, a presence of at least one residual bit is detected in a frame comprising a number of bytes that is less than a threshold, a presence of at least one residual bit is detected in a frame comprising a number of bytes that is greater than the threshold with violation of the rules for coding this or these residual bits, and an error is detected during the analysis of the cyclic redundancy check indication in a frame comprising a number of bytes that is less than the threshold.

According to one embodiment, in which a frame comprises several characters each comprising a byte of data and a cyclic redundancy check indication, the detector may be configured to analyze the start-of-frame indication, the end-of-frame indication, the structure of the characters, the cyclic redundancy check indication, the number of bytes of each frame, and the time interval between each character. Also, the detector may be configured to consider a transmission error as being an error that is to be ignored immediately upon the occurrence of at least one of the following: an error is detected in a frame comprising a number of bytes that is less than a threshold, during the analysis of the structure of the characters, or during the analysis of the cyclic redundancy check indication. Additionally, the controller may be configured to deliver to the control module an indication of error code associated with each of the cases.

According to another aspect, a reader may comprise a send/receive module such as defined hereinabove, for example, formed by an electronic chip, and a control module, for example, formed by another electronic chip, coupled to the send/receive module.

BRIEF DESCRIPTION OF THE DRAWINGS

Other advantages and characteristics of the present disclosure will be apparent on examining the detailed description of wholly non-limiting modes of implementation and embodiment, and the appended drawings in which.

DETAILED DESCRIPTION OF THE PREFERRED EMBODIMENTS

Figure 1:
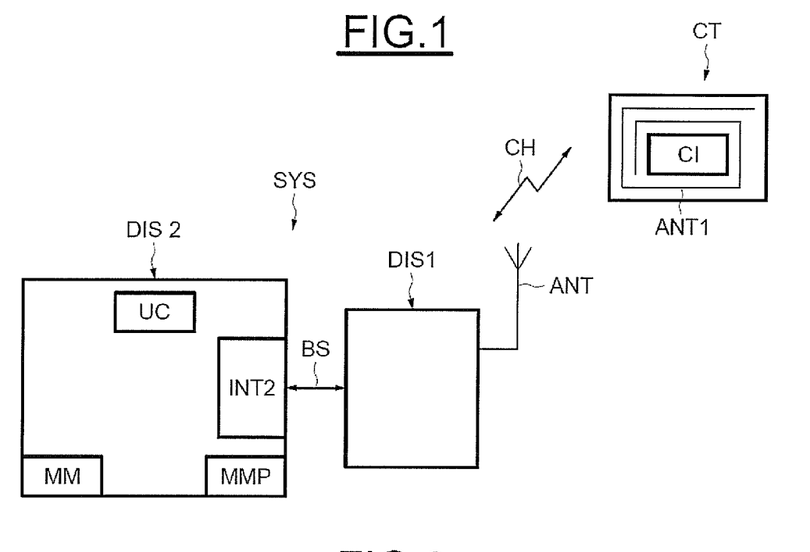
FIG. 1 is a schematic diagram of a wireless system, according to the present disclosure.

In FIG. 1, the reference SYS designates a contactless reader comprising a first integrated module DIS1 and a second integrated module DIS2. The modules DIS1 and DIS2 are here distinct integrated circuits or chips capable of exchanging information on a communications bus BS. In the example described here, the module DIS1 is a radio frequency (RF) send/receive module equipped with an antenna ANT and capable of sending and/or of receiving information on a transmission channel CH, here an RF transmission channel.

The information transmitted on the transmission channel CH is so in the form of frames comprising, in particular, bytes containing the bits of the information. These frames can, for example, conform in their structure to those described in the "EMV Contactless" specifications or to those described in the standard ISO/IEC 14 443 be it for a type A or type B protocol.

The reader SYS can thus communicate with another contactless item of equipment or device, for example, here a contactless chip card CT, or else as an embodiment a mobile telephone emulated in card mode and compatible with NFC technology, in particular, so as to perform bank transactions, for example, payment operations in accordance with the EMV specifications and, more precisely, the EMV contactless specifications. The other integrated module DIS2, is for example, a microcontroller embodied in the form of a chip, distinct from the chip DIS1, and intended in particular to control the send/receive module DIS2 (transceiver device/circuit).

In the example described here, the microcontroller DIS2 is a microcontroller having a typical, for example, eight-bit, central unit UC associated with various memories including a program memory MM. The microcontroller DIS2 can also comprise an additional memory MMP, here a protected memory, comprising an algorithm for encrypting/decrypting the information to be sent. In addition to the means which have just been described, the control module DIS2 also comprises an interface INT2 with the bus BS, which can be, for example, an SPI, I2C, UART, USB bus.

The RF send/receive module or head DIS1 exhibits a typical send/receive head structure, compatible, for example, with the standard ISO 14443A or B or else the standards ISO 15693 or ISO 18092, to within an exception which will be returned to in greater detail hereinafter, and relating to the detection of transmission errors to be ignored marring frames originating from the card. The role of the send/receive module DIS1 is, among others, to process the transmission errors that are to be ignored while the role of the external control module DIS2, is among others, to process the transmission errors which are not to be ignored.

Figure 2:
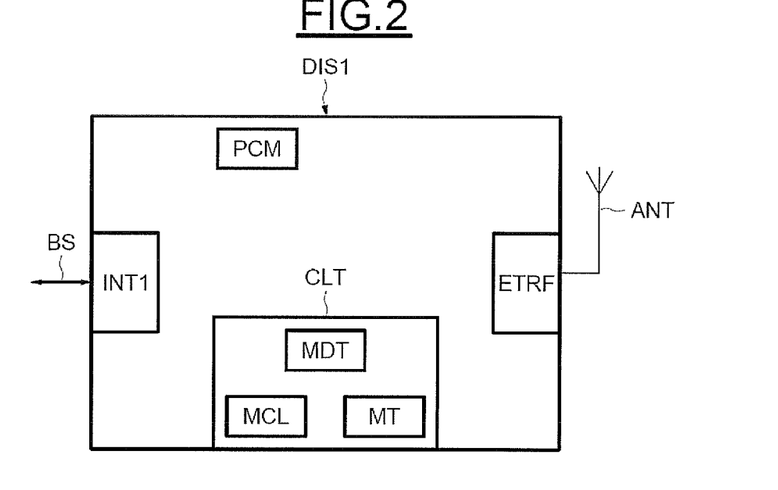
FIG. 2 is a schematic diagram of a send/receive head from the wireless system of FIG. 1.

Referring now to FIG. 2, it is seen that the send/receive head DIS1 comprises an input/output port or interface INT1 with the link bus BS as well as an RF stage ETRF connected to the antenna ANT. The structure of the RF stage ETRF is typical and comprises, in particular, means of modulation/demodulation of the frames (modulation/demodulation circuit), as well as local oscillators making it possible to adjust the carrier frequency on the transmission channel CH.

The stage ETRF and the antenna ANT here form reception means or a receiver configured to receive in the form of frames information originating from the card CT. The device DIS1 also comprises a microcontroller CTL comprising processing means or a processor MT configured to extract the information from the frames and deliver it to the control module DIS2 and detection means or a detector MDT configured to perform a detection of transmission errors that are to be ignored.

The microcontroller CTL also comprises command means or a command module MCL able to place or to reset the RF stage ETRF and the detector MDT in a state where they are ready to receive and analyze a frame originating from the card. The processor MT is also able, when sending, to encapsulate the information bits within frames having a structure compatible with that envisioned by the transmission standard used. The means/modules/circuits MT, MDT and MCL can be, for example, embodied in a software manner.

The module DIS1 also typically comprises a PCM power supply management block. In a typical manner, the combination "module DIS1-card CI" behaves as a transformer. An AC current passes through the antenna ANT of the reader and creates an electromagnetic field, which induces a current in the inductive antenna ANT1 of the card. The card converts this transmitted electromagnetic field (or RF field) into a DC voltage, for example, by way of a diode bridge and uses this DC voltage to power the electronic processing circuit CI of the card. The RF energy transmitted by the head DIS1 is also used to convey the information destined for the card by modulation of the carrier (13.56 MHz in the case of the standard ISO/IEC 14443).

The processing circuit of the card decodes, processes this information and responds to the reader by way of a charge modulation based on the electromagnetic coupling (i.e. the mutual inductance) between the RF head DIS1 and the card. More precisely, the electronic circuit modifies the current flowing in the antenna of the card as a function of the information to be transmitted. This variation in current is detected by the head DIS1 by a variation in current in the antenna ANT, typically measured by an increase in the voltage across the terminals of a resistor in series with the antenna ANT.

It is now assumed that the communication between the card CT and the reader SYS is performed in accordance with the specification "EMV Contactless Specifications for Payment Systems" in particular those contained in the books, in particular, book D, of version 2.1 of March 2011. It is also assumed in a first embodiment that the frames are those of type A of the "EMV contactless" specification.

Figure 3:
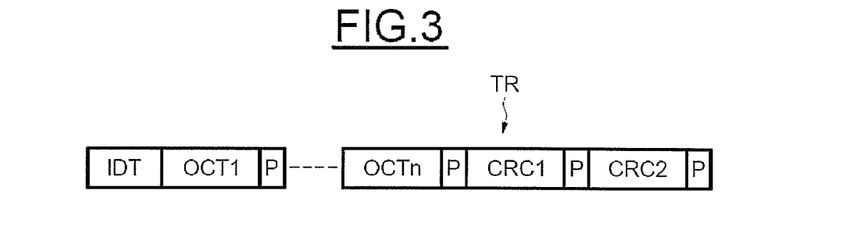
FIG. 3 is a schematic diagram of a frame structure from the wireless system of FIG. 1.

In this embodiment, certain frames transmitted from the card to the reader comprise, as illustrated in FIG. 3, a start-of-frame indication IDT, several bytes of data OCT1-OCTn, a cyclic redundancy check indication formed here of two bytes CRC1, CRC2, and a parity bit P after each byte. The indication IDT is designated by the letters SOF ("Start of Frame") in the "EMV contactless" specification. These frames containing responses of the card may be marred by transmission errors and some of these errors, due in particular to electromagnetic disturbances (noise) (EMD), must be ignored by the reader and the latter must then be capable of receiving and of processing a new frame (response) on completion of a predefined duration, dubbed Trecovery in the EMV contactless specifications, after the end of the response marred by the error that is to be ignored. This value is typically equal to 1280/f, where f designates the frequency of the carrier, i.e. about 94 microseconds for f equal to 13.56 MHz.

Figure 4:
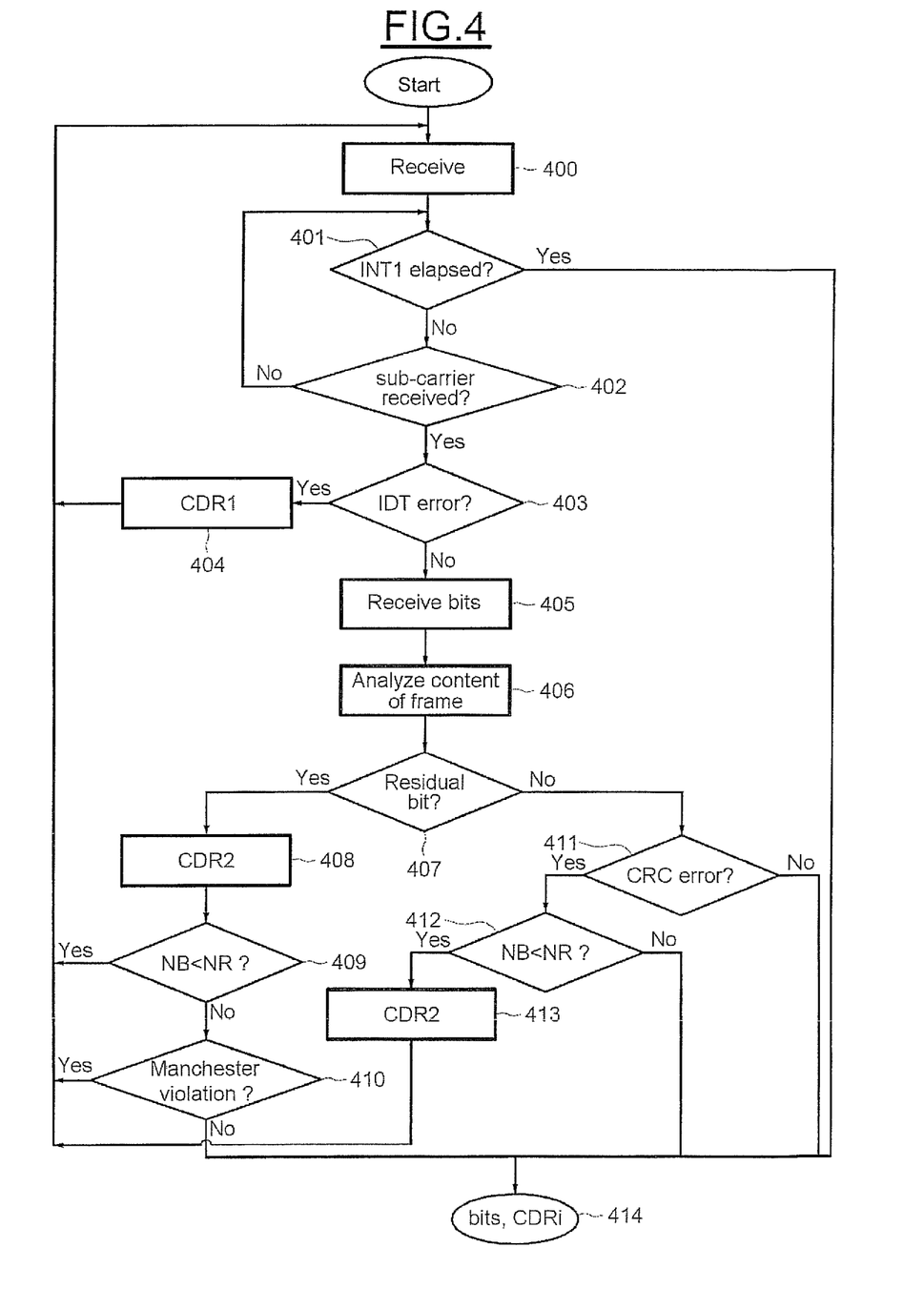
FIG. 4 is a flowchart illustrating operation of the wireless system of FIG. 1.

This detection of these errors due to noise (EMD) will be performed wholly within the RF head DIS1, for example, by using the progression of steps illustrated in FIG. 4 implemented by the detector means MDT and the command module MCL. The command module MCL places the RF stage ETRF and the detector MDT in a state 400 in which they are ready to receive and to process a frame originating from the card.

In steps 401 and 402, a test is performed to determine whether a modulated sub-carrier is received inside a predefined time interval INT1 dubbed FWT (Frame Waiting Time) in the EMV Contactless specifications. If such is the case, the method moves to step 403. Otherwise, the device is dealing with a transmission error which is not to be ignored and which is transmitted to the control module DIS2. The detector MDT thereafter undertakes an analysis 403 of the start-of-frame indication IDT.

A transmission error is considered to be an error that is to be ignored if an error is detected during the analysis of the start-of-frame indication. In this case, an error code CDR1 is assigned (step 404), and the command module MCL resets the RF stage and the detector MDT to the reception state 400. In steps 405 and 406, the reception of the various bytes and bits of the frame is undertaken, as is the analysis of the content of the frame.

The detector verifies (step 407) the possible presence of residual bits. Residual bits are present when the number of bits of the set of bytes transmitted is not a multiple of 8. In the presence of residual bits, the command module associates an error code CDR2 and then the detector determines whether the number of bytes received NB is less than a threshold NR, which is fixed typically at 4 in the EMV contactless specifications (step 409).

In the case where the number of bytes NB is less than NR, the command module considers the transmission error to be an error that is to be ignored, for example, an error of the EMD type, and then resets the RF stage ETRF and the detector MDT to the reception state 400. In the case where the frame comprises more than 4 bytes, it is determined whether or not the rules for coding these residual bits have been violated (step 410). Indeed, the transmitted bits are coded by a specific coding, for example, a Manchester type coding, as will be appreciated by the person skilled in the art. It is recalled here that according to the Manchester coding rule, a logic "1" is coded by a downward signal transition situated in the middle of the bit time while a logic "0" level is coded by an upward signal transition situated in the middle of the bit time. And, if, for example, for these residual bits, no upward or downward transition in the middle of the bit times is observed, there is then a violation of the Manchester coding rules, thereby signifying that these residual bits have high levels of noise.

In this case, the transmission error is considered to be an error that is to be ignored, for example, an error of the EMD type, and the command module resets the RF stage ETRF and the detector to the reception state 400. In the converse case, the residual bits are indeed real bits and this may be the case when using particular proprietary protocols. In this case, it is considered that the frame received is a valid frame and the processor MT of the radiofrequency head DIS1 extracts the data bits from the frame together with the residual bits and transmits them to the control module DIS2 (step 414).

Thus, the send/receive module and more globally the reader, is at one and the same time compatible with the "EMV contactless" specifications and with the implementation of a proprietary protocol, since the send/receive module is capable of distinguishing the residual bits (which are then real bits) from noise. In the case where in step 407, no residual bit is detected, the detector also analyzes the cyclic redundancy check indication, in this instance the bytes CRC1 and CRC2, to determine whether there is an error at this level.

In the affirmative, in step 412, the number of bytes NB of the frame is verified with respect to the threshold NF. If this number NB is less than NR, the transmission error is then an error that is to be ignored. The command module then resets the RF stage and the detector to the reception state 400 and associates the error code CDR3 with this error case (step 413).

In the case where no error of the cyclic redundancy check (CRC) type is detected in step 411, the frame received is then considered to be valid and the bits that it contains are extracted by the processor and transmitted to the control module DIS2. Moreover, if appropriate, the error code or codes CDRi assigned to the various error cases by the command module are also transmitted to the control module with the aim, for example, of performing a fine analysis of the types of error.

Figure 5:
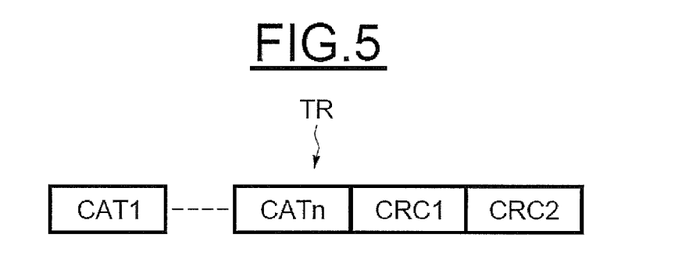
FIGS. 5-6 are schematic diagrams of data structures from the wireless system of FIG. 1.

In a second embodiment, the frames are of type B of the "EMV contactless" specification. In such an embodiment, certain frames transmitted from the card to the reader comprise, as in FIG. 5, several characters CAT1-CATn and a CRC indication formed here of two bytes CRC1 CRC2.

Figure 6:
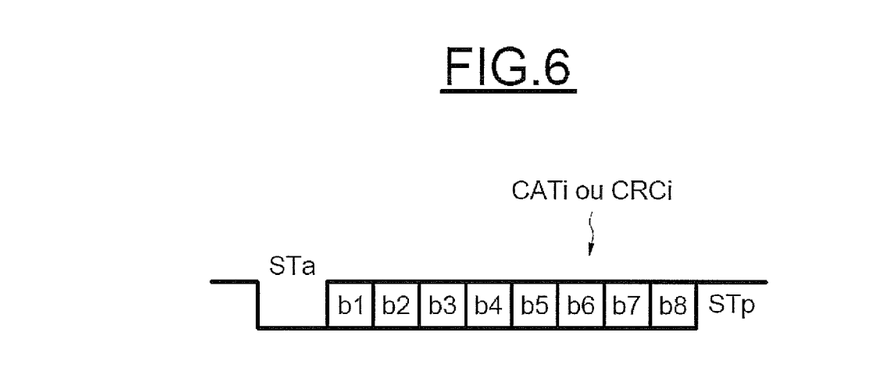

Moreover, as in FIG. 6, a character CATi or a character CRCi comprises a start bit STa in the "0" logic state followed by the 8 data bits b1-b8 of the byte contained in this character, followed by a stop bit STp in the "1" logic state. Furthermore, in accordance with the "EMV contactless" specifications, two consecutive characters of the frame are adjoining.

Figure 7:
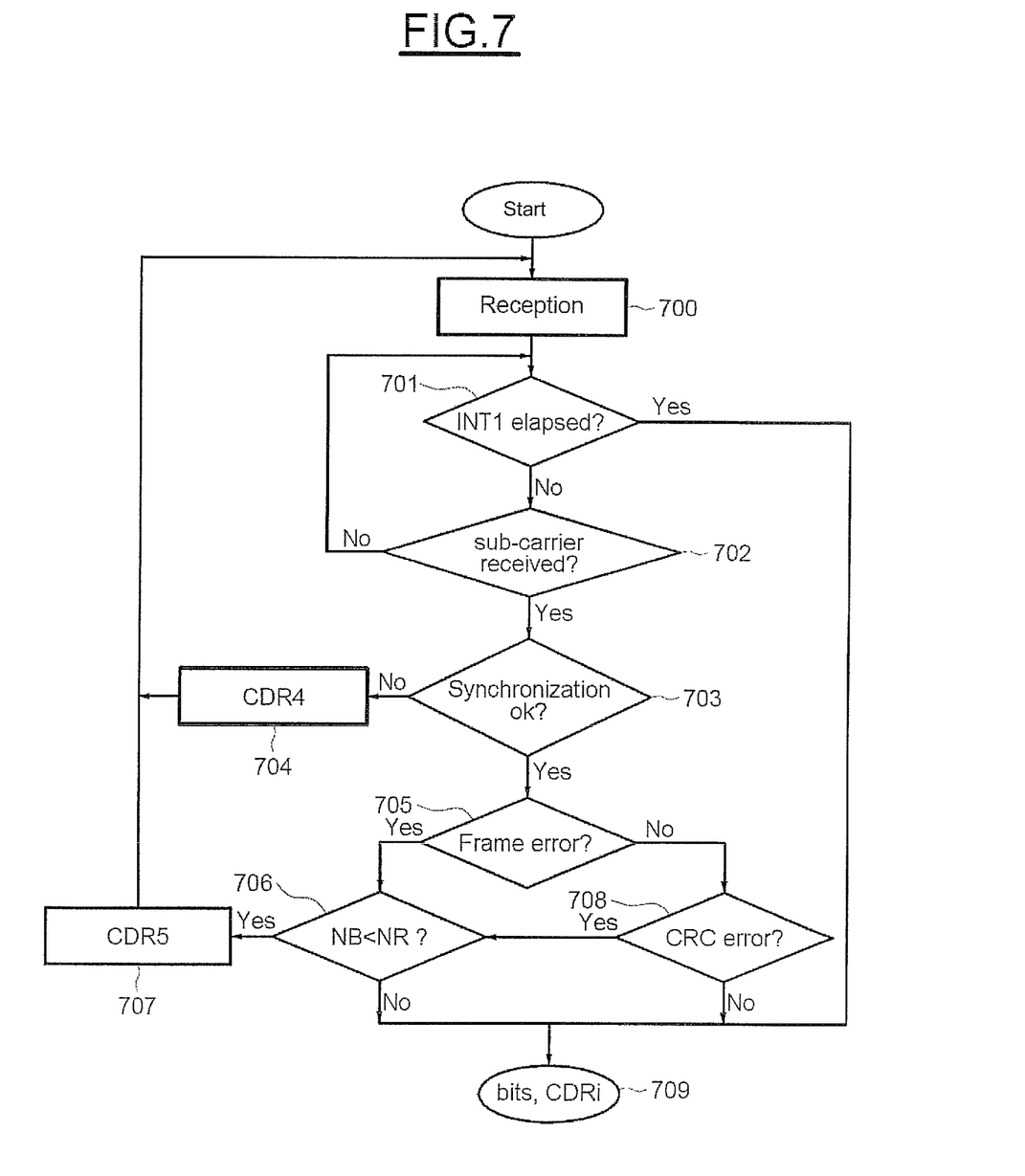
FIG. 7 is a flowchart illustrating operation of another embodiment of the wireless system of FIG. 1.

Here again, in this embodiment, the detection of the errors that are to be ignored, in particular, errors due to noise (EMD), will be performed wholly within the RF head DIS1, for example, by using the progression of step illustrated in FIG. 7 implemented by the detector MDT and the command module MCL. The command module MCL places the RF stage ETRF and the detector MDT in a state 700 in which they are ready to receive and to process a frame originating from the card.

In steps 701 and 702, a test is performed to determine whether a modulated sub-carrier is received inside the interval INT1. If such is the case, the method goes to step 703. Otherwise, the device is dealing with a transmission error which is not to be ignored and which is transmitted to the control module DIS2. The detector MDT thereafter verifies that the requirements in regard to synchronization are fulfilled. Such requirements involving, in particular, times TR0 and TR1, are described in the "EMV contactless" specifications.

If these synchronization requirements are not fulfilled, the device is dealing with a transmission error that is to be ignored to which the command module assigns an error code CDR4 (step 704). The command module then resets the RF stage and the detector to the state 700. In the case where the synchronization requirements are fulfilled in step 703, the detector thereafter undertakes an analysis of the structure of the frame received (step 705).

If an error is detected either in the structure and/or the number of the characters CTAi, then it is examined (step 706) as to whether the number NB of bytes received is less than the threshold NR (typically equal to 4). If such is the case, the command module MCL assigns an error code CRD5 for each of the error cases mentioned hereinabove (step 707) and resets the RF stage and the detector to the state 700, since the device is then dealing with a transmission error that is to be ignored.

In the converse case, the device is dealing with a transmission error that is to be processed by the control module. In the case where in step 705 no error has been detected, the detector tests for the presence or otherwise in step 708 of an error in the bytes CRC1 and CRC2. In the case of error, and if the number of characters received is less than NR, here again the device is dealing with a transmission error that is to be ignored. In the converse case, the device i dealing with a transmission error which is to be processed by the control module DIS2. If no error of CRC type is detected in step 708, then the frame is perfectly valid and the bits of the latter are extracted and transmitted to the control module (step 709).

Finally, in a manner analogous to what was described with reference to FIG. 4, all the error codes CRDi are also transmitted to the control module. Of course in the case where the format of the frames were that specified in the standard ISO/IEC 14443 (types A or B), envisioned, in particular, for type B start-of-frame and end-of-frame indications ("SOF", "EOF") as well as an interval ("EGT") between each character, these various parameters would also be analyzed upon detection of EMD transmission errors.

The detection of the transmission errors in the send/receive module and the auto-setting of this module to a new reception state after detection of a transmission error that is to be ignored, allows more effective discrimination of the transmission errors while allowing satisfaction of the temporal requirements mentioned in the EMVCo test specifications, for example, those contained in the document entitled EMVCo Type Approval Contactless Terminal Level 1, PCD Digital Test Bench & Test Cases, version 2.1a, October 2011.

Furthermore, the detection of the transmission errors wholly in the send/receive module alone, makes it possible, as regards satisfaction of the EMD tests, to render this module compatible with any type of control module. Indeed, since the send/receive module alone satisfies the requirements of these tests, the combination send/receive module external control module satisfies these requirements de facto whatever the type of control module, without it being necessary to modify the software structure of this control module. This non-modification of the software structure of the control module may ease the problem of managing EMD disturbances and may make it possible to afford a fast solution, in terms of development, to cover the EMVCo certification tests related to "EMD" disturbances.

That which is claimed is:

1. A method for processing transmission errors during contactless communication of information between a device and a reader, the method comprising:
   transmitting the information as a plurality of frames to a transceiver module of the reader in contactless coupling with the device and controlled by a control module coupled to the transceiver module;
   extracting the information from the plurality of frames within the transceiver module;
   detecting within the transceiver module at least one transmission error to be ignored, and when the at least one transmission error to be ignored is detected, then setting the transceiver module to a state ready to process a new frame originating from the device, otherwise sending the information to the control module;
   the at least one transmission error to be ignored comprising an error detected during analysis of a start-of-frame indication in the plurality of frames.

2. The method according to claim 1 wherein the at least one transmission error to be ignored comprises receiving less than a threshold number of bytes from the device.

3. The method according to claim 1 wherein the at least one transmission error to be ignored comprises a plurality of errors due to electromagnetic disturbances.

4. The method according to claim 3 wherein each frame comprises a plurality of characters, each character comprising a byte of data and a cyclic redundancy check indication; and wherein the analyzing comprises an analysis of a structure of the plurality of characters, an analysis of the cyclic redundancy check indication, and an analysis of a number of bytes of each frame.

5. The method according to claim 4 wherein a transmission error is considered to be an error to be ignored upon occurrence of at least one:
   an error is detected in a frame comprising a number of bytes less than a threshold during the analyzing of the structure of the plurality of characters or during the analyzing of the cyclic redundancy check indication.

6. The method according to claim 1 wherein the detection of the at least one transmission error to be ignored comprises analyzing with the transceiver module of at least one of a structure of the plurality of frames, a content of the plurality of frames, and rules for coding bits transmitted within the plurality of frames.

7. The method according to claim 6 wherein each frame comprises the start-of-frame indication, a plurality of bytes of data, and a cyclic redundancy check indication; and wherein bits in the plurality of frames are transmitted coded by a coding; and wherein the analyzing comprises an analysis of the cyclic redundancy check indication, an analysis of a number of bytes of each frame, an analysis of residual bits in each frame, and in the presence of at least one residual bit, a determination of a violation or otherwise of rules for coding the at least one residual bit.

8. The method according to claim 7 wherein a transmission error is considered to be an error to be ignored upon an occurrence of at least one of:
the at least one residual bit being detected in a frame comprising a number of bytes less than a threshold;
the at least one residual bit being detected in a frame comprising a number of bytes that is greater than the threshold with the violation of the rules for coding the at least one residual bit; and
an error being detected during the analysis of the cyclic redundancy check indication in a frame comprising a number of bytes less than the threshold.

9. The method according to claims 8 further comprising delivering to the control module an indication of an error code associated with each occurrence.

10. The method according to claim 1 wherein the device comprises an integrated circuit card.

11. A transceiver device of a reader to be in contactless coupling with a device and controlled by a controller, the transceiver device comprising:
a receiver configured to receive a plurality of frames from the device;
a processor configured to extract information from the plurality of frames, and deliver it to the controller;
a detector configured to detect at least one transmission error to be ignored; and
a command module configured to, after detection of the at least one transmission error to be ignored, place said receiver and said detector in a state ready to receive and to process a new frame from the device;
the at least one transmission error to be ignored comprising an error detected during analysis of a start-of-frame indication in the plurality of frames.

12. The transceiver device according to claim 11 wherein the at least one transmission error to be ignored comprises receiving less than a threshold number of bytes from the device.

13. The transceiver device according to claim 12 wherein said detector is configured to analyze at least one of a structure of the plurality of frames, a content of the plurality of frames, and rules for coding bits transmitted within the plurality of frames.

14. The transceiver device according to claim 13 wherein each frame comprises the start-of-frame indication, a plurality of bytes of data, and a cyclic redundancy check indication; wherein bits of the plurality of frames are transmitted coded by a coding; and wherein said detector is configured to analyze the cyclic redundancy check indication, a number of bytes of each frame, at least one residual bit in each frame, and in the case of presence of the at least one residual bit, to determine a violation of rules for coding the at least one residual bit.

15. The transceiver device according to claim 14 wherein said detector is configured to consider a transmission error to be an error to be ignored upon an occurrence of at least one of:
an error being detected during the analysis of the start-of-frame indication;
the at least one residual bit being detected in a frame comprising a number of bytes less than a threshold;
the at least one residual bit being detected in a frame comprising a number of bytes greater than the threshold with the violation of the rules for coding the at least one residual bit; and
an error being detected during the analysis of the cyclic redundancy check indication in a frame comprising the number of bytes that is less than the threshold.

16. The transceiver device according to claim 15 wherein said command module is configured to deliver to said controller an indication of error code associated with each occurrence.

17. The transceiver device according to claim 13 wherein each frame comprises a plurality of characters, each character comprising a byte of data and a cyclic redundancy check indication; and wherein said detector is configured to analyze, the structure of the characters, the cyclic redundancy check indication, and a number of bytes of each frame.

18. The transceiver device according to claim 17 wherein said detector is configured to consider a transmission error as being an error to be ignored upon occurrence of an error being detected in a frame comprising a number of bytes less than a threshold, during the analysis of the structure of the plurality of characters, or during the analysis of the end-of-frame indication, or during the analysis of the cyclic redundancy check indication.

19. The transceiver device according to claim 11 wherein the at least one transmission error to be ignored comprises a plurality of errors due to electromagnetic disturbances.

20. The transceiver device according to claim 11 wherein the device comprises an integrated circuit card.

21. A reader device comprising:
a controller;
a transceiver device cooperating with said controller and configured to be in contactless coupling with a device, said transceiver device comprising
a receiver configured to receive a plurality of frames from the device,
a processor configured to extract information from the plurality of frames, and deliver it to the controller,
a detector configured to detect at least one transmission error to be ignored, and
a command module configured to, after detection of the at least one transmission error to be ignored, place said receiver and said detector in a state ready to receive and to process a new frame from the device,
the at least one transmission error to be ignored comprising an error detected during analysis of a start-of-frame indication in the plurality of frames.

22. The reader device according to claim 21 wherein the at least one transmission error to be ignored comprises receiving less than a threshold number of bytes from the device.

23. The reader device according to claim 22 wherein said detector is configured to analyze at least one of a structure of the plurality of frames, a content of the plurality of frames, and rules for coding bits transmitted within the plurality of frames.

24. The reader device according to claim 23 wherein each frame comprises the start-of-frame indication, a plurality of bytes of data, and a cyclic redundancy check indication; wherein bits of the plurality of frames are transmitted coded by a coding; and wherein said detector is configured to analyze the cyclic redundancy check indication, a number of bytes of each frame, at least one residual bit in each frame, and in the case of presence of the at least one residual bit, to determine a violation of rules for coding the at least one residual bit.

25. The reader device according to claim 24 wherein said detector is configured to consider a transmission error to be an error to be ignored upon an occurrence of at least one of:
- the at least one residual bit being detected in a frame comprising a number of bytes less than a threshold;
- the at least one residual bit being detected in a frame comprising a number of bytes greater than the threshold with the violation of the rules for coding the at least one residual bit; and
- an error being detected during the analysis of the cyclic redundancy check indication in a frame comprising the number of bytes that is less than the threshold.

26. The reader device according to claim 21 wherein the at least one transmission error to be ignored comprises a plurality of errors due to electromagnetic disturbances.

* * * * *